(12) United States Patent
Kishi

(10) Patent No.: US 9,223,974 B2
(45) Date of Patent: Dec. 29, 2015

(54) ANTI-VIRAL COMPILER

(71) Applicant: GLOBALFOUNDRIES INC., Grand Cayman (KY)

(72) Inventor: Gregory T. Kishi, Oro Valley, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 98 days.

(21) Appl. No.: 13/937,389

(22) Filed: Jul. 9, 2013

(65) Prior Publication Data

US 2015/0020201 A1 Jan. 15, 2015

(51) Int. Cl.
*G06F 21/56* (2013.01)
*H04L 29/06* (2006.01)

(52) U.S. Cl.
CPC ............ *G06F 21/563* (2013.01); *H04L 63/145* (2013.01)

(58) Field of Classification Search
CPC ...... G06F 11/3612; G06F 21/52; G06F 21/54
See application file for complete search history.

(56) References Cited

U.S. PATENT DOCUMENTS

| | | | |
|---|---|---|---|
| 5,937,186 A * | 8/1999 | Horiguchi et al. ............ 712/244 | |
| 6,941,473 B2 | 9/2005 | Etoh et al. | |
| 7,287,166 B1 | 10/2007 | Chang et al. | |
| 7,380,245 B1 * | 5/2008 | Lovette .......................... | 718/100 |
| 7,849,444 B2 | 12/2010 | Melamed et al. | |
| 2001/0013094 A1 * | 8/2001 | Etoh et al. ...................... | 712/227 |
| 2003/0204745 A1 | 10/2003 | Abrams | |
| 2006/0101047 A1 | 5/2006 | Rice | |
| 2009/0234972 A1 * | 9/2009 | Raghu et al. ................... | 709/246 |
| 2009/0249289 A1 * | 10/2009 | Akritidis et al. ............... | 717/108 |
| 2009/0254738 A1 * | 10/2009 | Sato et al. ...................... | 712/226 |
| 2011/0138476 A1 | 6/2011 | Black et al. | |
| 2011/0154111 A1 | 6/2011 | Beilmann et al. | |

* cited by examiner

*Primary Examiner* — Hadi Armouche
*Assistant Examiner* — Cheng-Feng Huang

(57) ABSTRACT

In one general embodiment, a computer program product for compiling code includes a computer readable storage medium having computer readable code stored/encoded thereon. The computer readable code is readable/executable by a processor to: receive computer readable code to compile, the code including one or more functions, each function including one or more call functions; and build a stack frame for one of the call functions in the code. The stack frame includes: a return address sequence, logic configured to define local variables, logic configured to define a first guard variable and a second guard variable, logic configured to compare the first guard variable to the second guard variable, logic configured to execute the return address sequence when the first and second guard variables match, and logic configured to abort prior to executing the return address sequence when the first and second guard variables do not match.

18 Claims, 3 Drawing Sheets

ANTI-VIRAL COMPILER

BACKGROUND

The present invention relates to compilers, and more particularly, this invention relates to an anti-viral compiler which is capable of preventing buffer overflow virus attacks.

Buffer overflow by a virus is a typical way a virus is able to take over control of a program, routine, function, etc. This technique loads a string that is longer than a buffer, thereby allowing the virus to overwrite a particular targeted local variable buffer in a targeted function. One of the easiest overwrites is an unprotected string overwrite in a function that is not protected from such a call. Other types of buffer overwrites may also occur.

The overwrite is performed knowing that the function's return address is at a specific offset "after" the targeted memory buffer. The memory overwrite replaces the return address of the function and points it at the virus that is also included in the overwrite. In this way, when the function returns, instead of returning to its calling function, it returns to functions within the virus.

In one example, Function B has been called by Function A. When Function B returns, it uses the return address pointing at function A. A snippet of exemplary code is shown below which illustrates the above described functions and function calls:

| |
|---|
| Function B : Var |
| Local Vars : Var |
| : Target String |
| : Var |
| : Var |
| : |
| Return Address : Function A |

The virus forces the buffer overwrite, replacing the function's return address and points at its own code, as shown in the code snippet below:

| |
|---|
| Function B : Var |
| Local Vars : Var |
| : Virus |
| : Virus |
| : Virus |
| : Virus |
| Return Address : Function V |
| Virus |
| Function V |
| Virus function |
| Virus function |
| Virus function |
| …. |

Accordingly, since it is not desirable to allow a virus to take control of or otherwise attack a function or process through buffer overflow, it would be desirable to have a compiler that is capable of preventing buffer overwrite attacks from occurring.

BRIEF SUMMARY

A computer program product for compiling code, according to one embodiment, includes a computer readable storage medium having computer readable code stored/encoded thereon, the computer readable code being readable/executable by a processor to: receive, using the processor, computer readable code to compile, the code includes one or more functions, each function includes one or more call functions, and build, using the processor, a stack frame for one of the call functions in the code, the stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

A system according to one embodiment includes a processor and logic integrated with and/or executable by the processor. The logic is configured to: receive, using the processor, computer readable code to compile, the code includes one or more functions, each function includes one or more call functions, and build, using the processor, a stack frame for one of the call functions in the code, the stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

A method for compiling code, according to one embodiment, includes receiving computer readable code to compile, the code includes one or more functions, each function includes one or more call functions, and building a stack frame for one of the call functions in the code, the stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

Other aspects and embodiments of the present invention will become apparent from the following detailed description, which, when taken in conjunction with the drawings, illustrate by way of example the principles of the invention.

DETAILED DESCRIPTION

Figure 1:
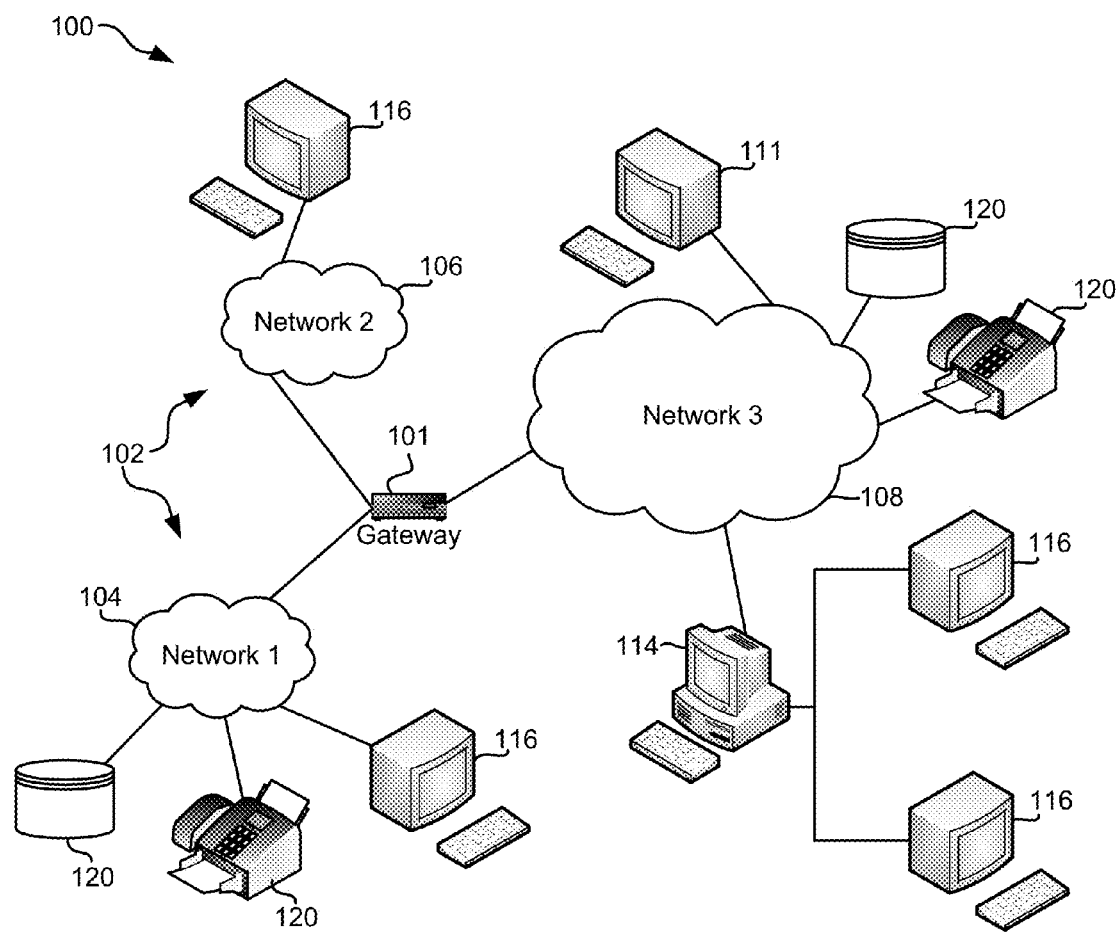
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of an anti-viral compiler for preventing buffer overflow attacks.

In one general embodiment, a computer program product for compiling code includes a computer readable storage medium having computer readable code stored/encoded thereon. The computer readable code is readable/executable by a processor to: receive, using the processor, computer readable code to compile, the code including one or more functions, each function including one or more call functions; and build, using the processor, a stack frame for one of the call functions in the code. The stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

In another general embodiment, a system includes a processor and logic integrated with and/or executable by the processor. The logic is configured to: receive, using the processor, computer readable code to compile, the code including one or more functions, each function including one or more call functions; and build, using the processor, a stack frame for one of the call functions in the code. The stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

In yet another general embodiment, a method for compiling code includes receiving computer readable code to compile, the code includes one or more functions, each function includes one or more call functions; and building a stack frame for one of the call functions in the code. The stack frame includes: a return address sequence, logic configured to define local variables, logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that is able to contain, or store a program for use by or in connection with an instruction execution system, apparatus, or device.

A computer readable signal medium may include a propagated data signal with computer readable program code embodied therein, for example, in baseband or as part of a carrier wave in such devices as an electrical connection having one or more wires, an optical fiber, etc. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
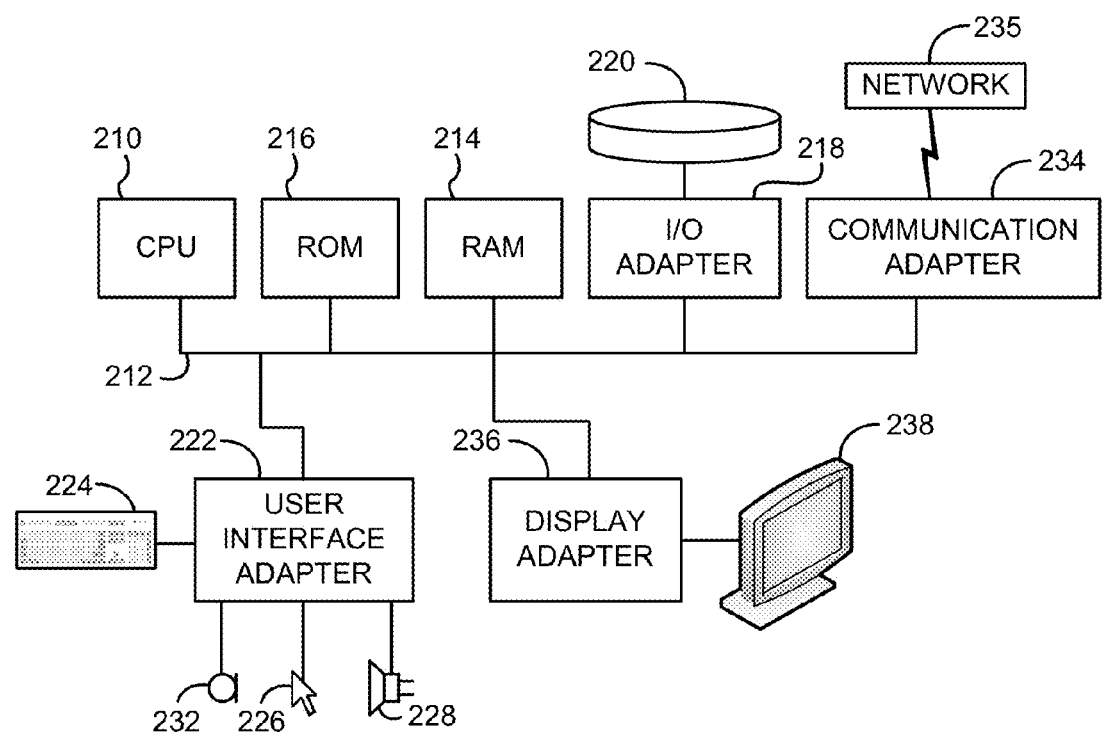
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to one embodiment, viral takeover through buffer overwrite or buffer overflow may be prevented by using a compiler which is configured to create safeguards against such an attack. This compiler may include special code—perhaps code that may be added to a compiler using an antiviral flag (similar to an optimization flag in existing compilers). In all functions or in all antiviral flagged functions (pragmas or some other suitable compiler "clues" may be used) the following changes may be made to enact the buffer overwrite virus attack prevention.

According to one embodiment, the compiler inserts a first guard variable prior to a first function defined local variable and a second guard variable after a last function defined local variable for a particular function. In one example, a "time value" may be used to enhance the guard variables, but any other data may be used in addition to or in place of the time data. For example, other values that may be used include a static numeric string, a dynamic numeric string (which changes according to some predetermined algorithm), a static alphanumeric string, a dynamic alphanumeric string, a hash of some predetermined value (according to a hashing algorithm), or any other suitable value or set of values.

A time value is desirable because it is a dynamic value which changes constantly and predictably, and therefore it cannot be determined easily by a hacker or other nefarious entity trying to overcome the buffer overwrite virus attack protection. For example, a hacker may utilize a static code scan in order to determine the variable(s) which must be manipulated in order to overcome the protection. By using a dynamic variable, it is less likely that the static code scan would be capable of determining the proper variables to manipulate.

When using the time value as an enhancement, upon starting the function, the compiler adds code to capture the current time and stores the current time into both guard variables. In one embodiment, the time value may be manipulated by some algorithm in order to mask the actual value, but which is capable of being reversed in order to verify the value stored. In another embodiment, a representation of the time value may be stored to both guard variables, such as in a time/date format, just time, sec:min:hour:day, ms:sec:min:hour, etc. The compiler inserts code configured to check and verify, prior to return, that both guard variables are equal (i.e., first guard variable=second guard variable) before returning. The compiler is further configured to insert code configured to crash (panic) when both guard variables are not equal. This prevents the code from executing further when a buffer overflow has overwritten or otherwise changed the first or second guard variables (typically the second guard variable will be changed due to the overwrite). Therefore, if a virus has intentionally caused the buffer overwrite, the code will crash before the virus is able to take control of the function.

An exemplary stack with the compiled code operating properly is shown below, according to one embodiment:

---

Guard(pre) : CallTime
Function B : Var
Local Vars : Var
: Target String
: Var
: Var
Guard(post) : CallTime
Return Address : Function A

---

The CallTime routine is loaded when the function is called. The executable code generated by the compiler, according to one embodiment, has an additional check at the return, e.g., does Guard(pre)==Guard(post)? If so, then return; otherwise crash(panic). In the case shown above, the first guard variable, Guard(pre), is equal to the second guard variable, Guard (post). Therefore, this function would return.

An exemplary stack that has been affected by a virus, e.g., the virus overwrote the Guard(post), is shown below, according to one embodiment:

---

Guard(pre) : CallTime
Function B : Var
Local Vars : Var
: Virus
: Virus
: Virus
Guard(post) : Virus
Return Address : Function V
Virus
Function V
Virus function
Virus function
Virus function
...

---

When the exemplary compiled code above checks whether Guard(pre)==Guard(post), the variables will not match (are not equal) and the code will crash(panic) and not return to Function V (the active virus code), thereby preventing activation of the virus.

In addition to causing the function, routine, or program to crash (panic), the compiled code may also be caused to log occurrences, force a memory dump, force a core-dump, or otherwise provide some form of a diagnostic dump for use in trouble-shooting the crash.

Generally, this type of virus attack may only affect the stack from the location of the buffer being overwritten. In the case where additional protection is required, this the compiler (possibly invoked with a higher level of virus protection flag) may additionally "malloc" or allocate a third guard variable from a "heap" and load this third guard variable with the same value (such as a time value) as the first and second guard variables. Prior to executing the return address sequence, the compiled code is configured to verify that all three guard variables, Guard(pre), Guard(post), and Guard(heap) match. If any does not match, the code is aborted prior to executing the return address sequence. Then, the code is configured to free the malloc'ed guard variable on the heap and allow a return when all three guard variable values match.

Figure 3:
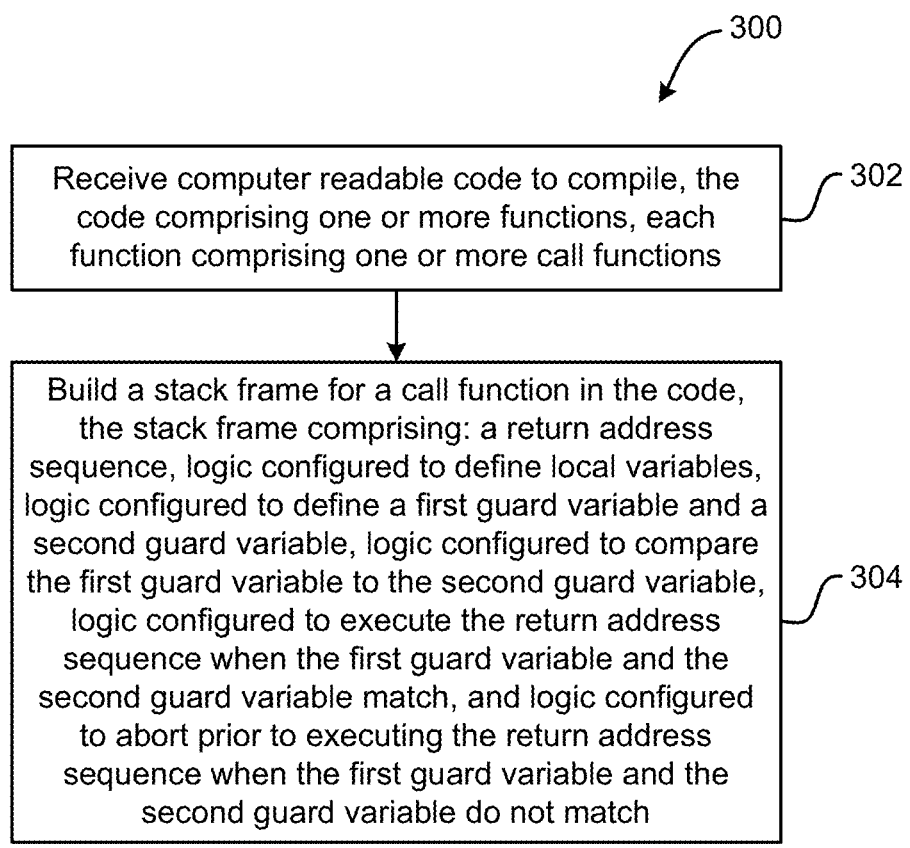
FIG. 3 shows a flowchart of a method, according to one embodiment.

FIG. 3 depicts a method 300 for compiling code, in accordance with one embodiment. As an option, the present method 300 may be implemented in conjunction with features from any other embodiment listed herein, such as those described with reference to the other figures. Of course, however, such method 300 and others presented herein may be used in various applications and/or in permutations which may or may not be specifically described in the illustrative embodiments listed herein. Further, the method 300 presented herein may be used in any desired environment.

With reference now to FIG. 3, the method 300 begins with operation 302, where computer readable code to compile is received, such as with a processor or some other suitable device (computer, ASIC, FPGA, integrated circuit, etc.). The code comprises one or more functions and each function comprises one or more call functions.

In operation 304, a stack frame is built for a call function in the code. Of course, multiple stack frames may be built, one for each call function in the code. In order to avoid confusion, the method 300 is described for the construction of just one stack frame; however, method 300 may be repeated for as many call functions as are present in the code to be compiled.

The stack frame has at least one return address sequence and logic configured to define all local variables. In addition, the stack frame further comprises logic configured to define a first guard variable and a second guard variable, logic configured to compare the first guard variable to the second guard variable, logic configured to execute the return address sequence when the first guard variable and the second guard variable match, and logic configured to abort prior to executing the return address sequence when the first guard variable and the second guard variable do not match.

In one embodiment, the first guard variable may be inserted at a beginning of the stack frame, prior to the stack frame, or in some other suitable location where the first guard variable is defined prior to execution of any other features or functions in the code.

In one approach, the second guard variable may be inserted prior to the return address sequence in the stack frame (such as immediately prior, or within a few lines of code prior to the return address sequence). In this way, the second guard variable is inserted before the return address sequence would be executed after the code is compiled and used.

In one embodiment, the method 300 may further comprise performing a diagnostic dump when the first guard variable and the second guard variable do not match. In this way, information that may be useful in determining a cause of the abort may be sent to an administrator, user, or some other suitable entity capable of tracing down the corruption in the code and fix it prior to any damage being done or malicious activity taking place.

In another embodiment, the method 300 may further comprise allocating a third guard variable in a heap. In this embodiment, the stack frame may further comprise logic configured to compare the first guard variable, the second guard variable, and the third guard variable, logic configured to execute the return address sequence when all of the first guard variable, the second guard variable, and the third guard variable match, and logic configured to abort when any of the first guard variable, the second guard variable, and the third guard variable do not match. Of course, the logic configured to compare the guard variables that was described previously may be altered to include the third guard variable check, or additional code may be added to perform this check in addition to the prior code.

In a further embodiment, the method 300 may comprise performing a diagnostic dump when the first guard variable, the second guard variable, and the third guard variable do not match.

According to yet another embodiment, the first guard variable, the second guard variable, and the third guard variable may be defined based on a time value or some other suitable dynamic value that is difficult to hack or otherwise determine from a static review of the compiled code.

In another embodiment, a computer program product for compiling code may execute the method 300 or a variation thereof. The computer program product may comprise a computer readable storage medium having computer readable code stored/encoded thereon, the computer readable code being readable/executable by a processor to perform some or all of the operations of method 300.

In another embodiment, a system may include a processor (such as a hardware processor like a CPU, ASIC, FPGA, etc.) and logic integrated with and/or executable by the processor. The logic is configured to execute some or all of the operations of method 300, as described above.

It will be clear that the various features of the foregoing embodiments may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for compiling code, the computer program product comprising a computer readable storage medium having computer readable code stored/encoded thereon, the computer readable code being readable/executable by a processor to:
   receive, using the processor, computer readable code to compile, the code comprising one or more functions, each function comprising one or more call functions; and
   build, using the processor, a stack frame for one of the call functions in the code, the stack frame comprising:
      a return address sequence;
      logic configured to define local variables;
      logic configured to define a first guard variable, a second guard variable, and a third guard variable in a heap, wherein the first guard variable is inserted at a beginning of the stack frame, and wherein the second guard variable is inserted prior to the return address sequence in the stack frame;
      logic configured to compare the first guard variable to the second guard variable;
      logic configured to execute the return address sequence when the first guard variable and the second guard variable match; and
      logic configured to abort prior to executing the return address sequence when the first guard variable and the second guard variable do not match,
      wherein the first guard variable, the second guard variable, and the third guard variable are defined based on a time value, the time value being manipulated by an algorithm to mask the actual time value and stored in the first guard variable, the second guard variable, and the third guard variable.

2. The computer program product as recited in claim 1, wherein the computer readable code is further readable/executable by the processor to perform a diagnostic dump when the first guard variable and the second guard variable do not match.

3. The computer program product as recited in claim 1, wherein the stack frame further comprises:
   logic configured to compare the first guard variable, the second guard variable, and the third guard variable;
   logic configured to execute the return address sequence when all of the first guard variable, the second guard variable, and the third guard variable match; and
   logic configured to abort prior to executing the return address sequence when any of the first guard variable, the second guard variable, and the third guard variable do not match.

4. The computer program product as recited in claim 3, wherein the computer readable code is further readable/executable by the processor to perform a diagnostic dump when any of the first guard variable, the second guard variable, and the third guard variable do not match.

5. A system, comprising a processor and logic integrated with and/or executable by the processor, the logic being configured to:
   receive, using the processor, computer readable code to compile, the code comprising one or more functions, each function comprising one or more call functions; and
   build, using the processor, a stack frame for one of the call functions in the code, the stack frame comprising:
      a return address sequence;
      logic configured to define local variables;

logic configured to define a first guard variable, a second guard variable, and a third guard variable in a heap;

logic configured to compare the first guard variable to the second guard variable;

logic configured to execute the return address sequence when the first guard variable and the second guard variable match; and logic configured to abort prior to executing the return address sequence when the first guard variable and the second guard variable do not match, wherein the first guard variable, the second guard variable, and the third guard variable are defined based on a time value, the time value being manipulated by an algorithm to mask the actual time value and stored in the first guard variable, the second guard variable, and the third guard variable.

6. The system as recited in claim 5, wherein the first guard variable is inserted at a beginning of the stack frame.

7. The system as recited in claim 5, wherein the second guard variable is inserted prior to the return address sequence in the stack frame.

8. The system as recited in claim 5, wherein the logic is further configured to perform a diagnostic dump when the first guard variable and the second guard variable do not match.

9. The system as recited in claim 5, wherein the stack frame further comprises:

logic configured to compare the first guard variable, the second guard variable, and the third guard variable;

logic configured to execute the return address sequence when all of the first guard variable, the second guard variable, and the third guard variable match; and logic configured to abort prior to executing the return address sequence when any of the first guard variable, the second guard variable, and the third guard variable do not match.

10. The system as recited in claim 9, wherein the logic is further configured to perform a diagnostic dump when any of the first guard variable, the second guard variable, and the third guard variable do not match.

11. A method for compiling code, the method comprising:

receiving computer readable code to compile, the code comprising one or more functions, each function comprising one or more call functions; and building a stack frame for one of the call functions in the code, the stack frame comprising:
a return address sequence;
logic configured to define local variables;
logic configured to define a first guard variable, a second guard variable, and a third guard variable in a heap, wherein the first guard variable, the second guard variable, and the third guard variable are defined based on a time value, the time value being manipulated by an algorithm to mask the actual time value and stored in the first guard variable, the second guard variable, and the third guard variable;

logic configured to compare the first guard variable to the second guard variable;

logic configured to execute the return address sequence when the first guard variable and the second guard variable match; and logic configured to abort prior to executing the return address sequence when the first guard variable and the second guard variable do not match.

12. The method as recited in claim 11, wherein the first guard variable is inserted at a beginning of the stack frame.

13. The method as recited in claim 11, wherein the second guard variable is inserted prior to the return address sequence in the stack frame.

14. The method as recited in claim 11, further comprising performing a diagnostic dump when the first guard variable and the second guard variable do not match.

15. The method as recited in claim 11, wherein the stack frame further comprises:

logic configured to compare the first guard variable, the second guard variable, and the third guard variable;

logic configured to execute the return address sequence when all of the first guard variable, the second guard variable, and the third guard variable match; and logic configured to abort when any of the first guard variable, the second guard variable, and the third guard variable do not match.

16. The method as recited in claim 15, further comprising performing a diagnostic dump when the first guard variable, the second guard variable, and the third guard variable do not match.

17. The computer program product as recited in claim 1, wherein the time value is related to when building of the stack frame begins.

18. The method as recited in claim 11, wherein the first guard variable is inserted at a beginning of the stack frame, wherein the second guard variable is inserted prior to the return address sequence in the stack frame, and wherein the time value is related to when the building of the stack frame begins.

* * * * *